United States Patent
Haen et al.

(10) Patent No.: US 10,318,193 B2
(45) Date of Patent: Jun. 11, 2019

(54) SYSTEMS AND METHODS OF COMMAND AUTHORIZATION

(71) Applicant: SANDISK TECHNOLOGIES LLC, Plano, TX (US)

(72) Inventors: Ronen Haen, Kibbutz Parod (IL); Shmuel Cohen, Yoqneam Illit (IL); Alon Marcu, Tel-Mond (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 42 days.

(21) Appl. No.: 14/853,759

(22) Filed: Sep. 14, 2015

(65) Prior Publication Data
US 2017/0075824 A1    Mar. 16, 2017

(51) Int. Cl.
| G06F 12/00 | (2006.01) |
| G06F 3/06 | (2006.01) |
| G06F 13/42 | (2006.01) |
| G06F 21/62 | (2013.01) |

(52) U.S. Cl.
CPC ......... *G06F 3/0622* (2013.01); *G06F 3/0659* (2013.01); *G06F 3/0688* (2013.01); *G06F 12/00* (2013.01); *G06F 13/4243* (2013.01); *G06F 21/6218* (2013.01)

(58) Field of Classification Search
CPC ..................................................... G06F 12/00
USPC ....................................................... 711/103
See application file for complete search history.

(56) References Cited

U.S. PATENT DOCUMENTS

| 5,956,742 | A  | * | 9/1999 | Fandrich | ............... | G11C 16/16 |
| | | | | | | 710/262 |
| 6,886,083 | B2 | | 4/2005 | Murakami | | |
| 8,255,615 | B1 | * | 8/2012 | Yoon | ...................... | G06F 3/061 |
| | | | | | | 711/103 |
| 8,935,465 | B1 | | 1/2015 | Shaharabany et al. | | |
| 8,966,176 | B2 | | 2/2015 | Duzly et al. | | |
| 2011/0055453 | A1 | * | 3/2011 | Bennett | .................. | G11C 16/10 |
| | | | | | | 711/103 |
| 2012/0203986 | A1 | * | 8/2012 | Strasser | ............... | G06F 3/0611 |
| | | | | | | 711/158 |
| 2013/0326141 | A1 | | 12/2013 | Marcu et al. | | |
| 2014/0082267 | A1 | | 3/2014 | Yoo et al. | | |
| 2014/0089568 | A1 | | 3/2014 | Chung et al. | | |
| 2015/0039909 | A1 | | 2/2015 | Tseng et al. | | |
| 2015/0074294 | A1 | | 3/2015 | Shacham et al. | | |
| 2016/0291878 | A1 | * | 10/2016 | Kang | ...................... | G06F 3/068 |

OTHER PUBLICATIONS

PCT Application No. PCT/US2016/037042, International Search Report and the Written Opinion of the International Searching Authority, dated Aug. 30, 2016, 13 pages.

(Continued)

*Primary Examiner* — Gautam Sain
(74) *Attorney, Agent, or Firm* — Vierra Magen Marcus LLP

(57) ABSTRACT

A device includes a non-volatile memory and a controller coupled to the non-volatile memory. The device may be configured according to a mode in which execution of a particular command is unauthorized while the device is configured in the mode. While in the mode, the device may authorize execution of the command to occur during the mod.

26 Claims, 3 Drawing Sheets

(56) References Cited

OTHER PUBLICATIONS

JEDEC, JEDEC Standard Embedded Multi-Media Card (eMMC) Electrical Standard (5.1), http://www.jedec.org/sites/default/files/docs/JESD84-B51.pdf, Feb. 1, 2015, Arlington, VA, 352 pages.
JEDEC Standard, Embedded Multi-Media Card (eMMC) Electrical Standard (5.1), JESD84-B51, JEDEC Solid State Technology Association, Feb. 2015, 1-352.

* cited by examiner

SYSTEMS AND METHODS OF COMMAND AUTHORIZATION

FIELD OF THE DISCLOSURE

This disclosure is generally related to command authorization.

BACKGROUND

Non-volatile data storage devices, such as embedded memory devices and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data.

Many data storage devices can operate in a multiple distinct mode. For example, certain data storage devices may be operable in a command queue mode when a command queue is enabled and not empty. Each mode of operation may be associated with a set of operations that are authorized (e.g., allowed) to be executed by the data storage device. The set of authorized commands may not include all commands that are recognized by the data storage device. That is, some commands may be unauthorized for execution while operating in particular modes. To be able to execute an unauthorized command, the data storage device may have to exit the current mode of operation. For example, while operating in the command queue mode, to execute a command that is not authorized for execution in the command queue mode, a data storage device may need to exit the command queue mode, e.g., by flushing the command queue of all pending commands (without executing the pending commands) or by execute each of the pending commands in the command queue to empty the command queue. After the command queue is empty, the device may be able to change modes and execute commands that are not authorized in the command queue mode. Flushing the command queue of pending commands or executing all pending commands in the command queue delays execution of a command that is not authorized in the command queue mode

DETAILED DESCRIPTION

Figure 1:
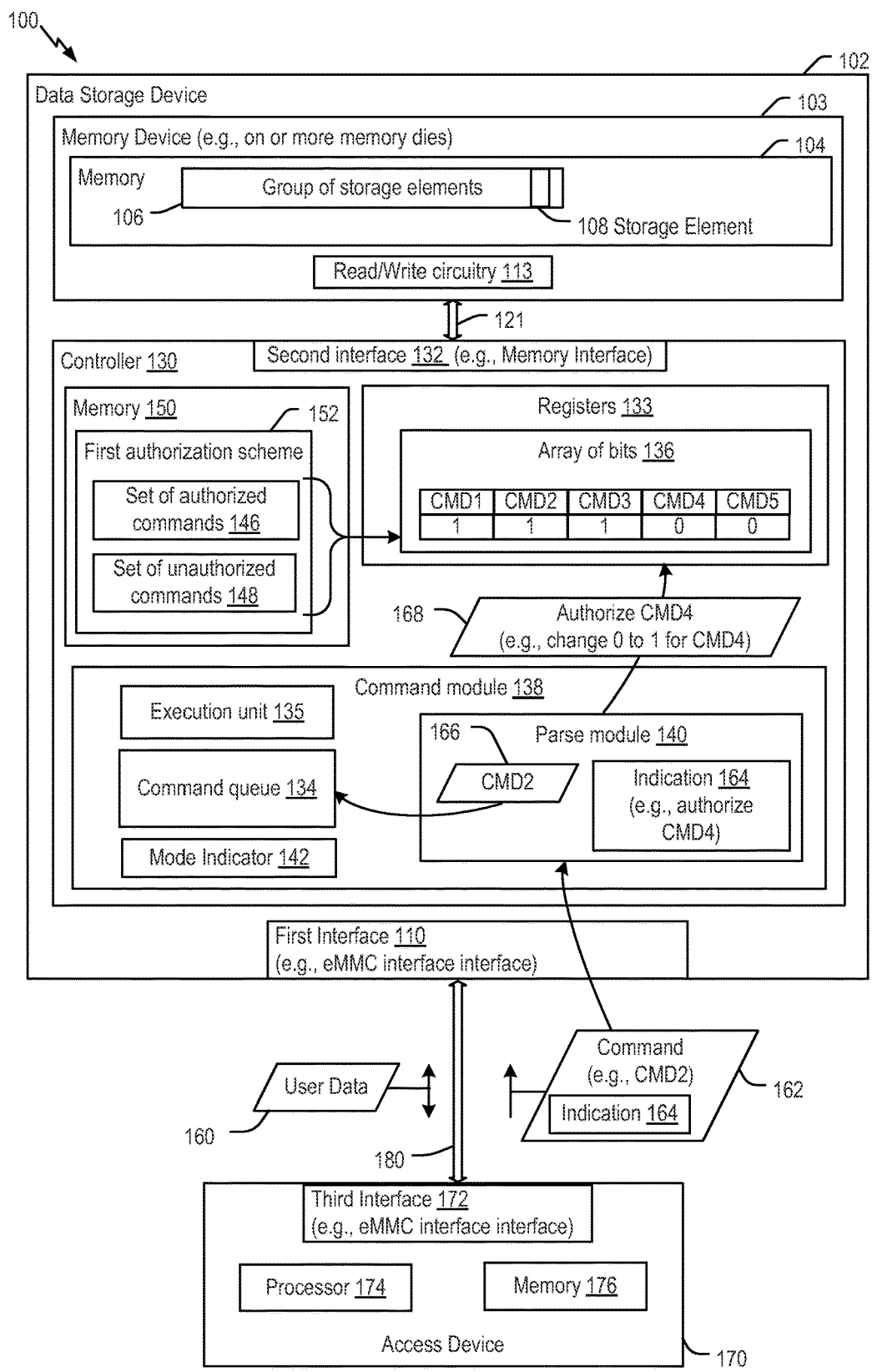
FIG. 1 is a block diagram of a particular illustrative example of a system including a data storage device operable to authorize execution of an unauthorized command.

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "examplary" may indicate an example, an implementation, and/or an aspect, and should not be construed as limiting or as indicating a preference or a preferred example, implementation, and/or aspect.

The present disclosure describes systems and methods of authorizing execution of particular commands while a data storage device is in a first mode, such as a command queue mode. While operating in the first mode (e.g., while a command queue is enabled and occupied), the data storage device may receive an indication from an access device, such as a host device, to authorize (e.g., permit) execution of a particular command that is not authorized during operation in the first mode (e.g., an unauthorized command). In response to the indication, the data storage device may temporarily authorize execution of the particular command while in the first mode. To illustrate, the data storage device may maintain an array of bits, where each bit corresponds to a different command. The value of a particular bit may indicate whether a particular corresponding command is categorized as authorized or unauthorized during operation in the first mode. To authorize (temporarily) execution of the particular command, the data storage device may change a bit value corresponding to the particular command from a first value (e.g., a logical zero) to a second value (e.g., a logical one). After execution of the particular command while operating in the first mode, the data storage device may change the bit value corresponding to the particular command from the second value (e.g., the logical one) to the first value (e.g., the logical zero) to categorize the particular command as unauthorized (e.g., prohibited). Thus, the present disclosure enables a device configured in the first mode (e.g., the command queue mode) to temporarily authorize an otherwise unauthorized command to be executed without changing from the first mode to a second mode (e.g., by emptying the command queue).

FIG. 1 depicts an illustrative example of a system 100. The system 100 includes a data storage device 102 and an access device 170. The data storage device 102 includes a controller 130 and a memory device 103 that is coupled to the controller 130. The memory device 103 may include one or more memory dies.

The data storage device 102 and the access device 170 may be coupled via a connection (e.g., a communication path 180), such as a bus or a wireless connection. The data storage device 102 may include a first interface 110 (e.g., an eMMC (embedded MultiMedia Card) interface) that enables communication via the communication path 180 between the data storage device 102 and the access device 170.

In some implementations, the data storage device 102 may be attached to or embedded within one or more access devices, such as within a housing of the access device 170. For example, the data storage device 102 may be embedded within the access device 170, such as in accordance with a Joint Electron Devices Engineering Council (JEDEC) Solid State Technology Association Universal Flash Storage (UFS) configuration. For example, the data storage device 102 may be configured to be coupled to or embedded within the access device 170 as embedded memory, such as eMMC® (trademark of JEDEC Solid State Technology Association, Arlington, Virginia) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). To further illustrate, the data storage device 102 may be integrated within an apparatus, such as a mobile telephone, a computer (e.g., a laptop, a tablet, or a notebook computer), a music player, a video player, a gaming device or console, an electronic book reader, a personal digital assistant (PDA), a portable navigation device, a vehicle electronics system, or another device that uses non-volatile memory.

In other implementations, the data storage device 102 may be implemented in a portable device configured to be selectively coupled to one or more external access devices. For example, the data storage device 102 may be removable from the access device 170 (i.e., "removably" coupled to the access device 170). As an example, the data storage device 102 may be removably coupled to the access device 170 in accordance with a removable universal serial bus (USB) configuration. In still other implementations, the data storage device 102 may be a component (e.g., a solid-state drive (SSD)) of a network accessible data storage system, such as an enterprise data system, a network-attached storage system, a cloud data storage system, etc.

In some implementations, the data storage device 102 may include or correspond to a solid state drive (SSD) which may be included in, or distinct from (and accessible to), the access device 170. For example, the data storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 102 is coupled to the access device 170 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the data storage device 102 may be a network-attached storage (NAS) device or a component (e.g., a solid-state drive (SSD) device) of a data center storage system, an enterprise storage system, or a storage area network.

The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof In some implementations, the data storage device 102 and the access device 170 may be configured to communicate using one or more protocols, such as an eMMC protocol, a universal flash storage (UFS) protocol, a universal serial bus (USB) protocol, a serial advanced technology attachment (SATA) protocol, and/or another protocol, as illustrative, non-limiting examples.

The access device 170 may include a third interface 172 (an eMMC interface) and may be configured to communicate with the data storage device 102 via the third interface 172 to read data from and write data to the memory device 103 of the data storage device 102. For example, the access device 170 may operate in compliance with a Joint Electron Devices Engineering Council (JEDEC) industry specification, such as a Universal Flash Storage (UFS) Access Controller Interface specification. As other examples, the access device 170 may operate in compliance with one or more other specifications, such as a Secure Digital (SD) Access Controller specification, as an illustrative, non-limiting example. The access device 170 may communicate with the memory device 103 in accordance with any other suitable communication protocol.

The access device 170 may include a processor 174 and a memory 176. The memory 176 may be configured to store data and/or instructions that are executable by the processor 174. The memory 176 may be a single memory or may include multiple memories, such as one or more non-volatile memories, one or more volatile memories, or a combination thereof The access device 170 may issue one or more commands to the data storage device 102, such as one or more requests to erase data, read data from, or write data to the memory device 103 of the data storage device 102. For example, the access device 170 may be configured to provide data, such as user data 160, to be stored at the memory device 103 or to request data to be read from the memory device 103. The access device 170 may correspond to a mobile telephone, a computer (e.g., a laptop, a tablet, or a notebook computer), a music player, a video player, a gaming device or console, an electronic book reader, a personal digital assistant (PDA), a portable navigation device, a computer, such as a laptop computer or notebook computer, a network computer, a server, a vehicle electronics system, any other electronic device, or any combination thereof, as illustrative, non-limiting examples.

The memory device 103 of the data storage device 102 may include one or more memory dies (e.g., one memory die, two memory dies, eight memory dies, or another number of memory dies). The memory device 103 includes a memory 104, such as a non-volatile memory of storage elements included in a memory die. For example, the memory 104 may include a flash memory, such as a NAND flash memory, as an illustrative, non-limiting example. The memory 104 may have a three-dimensional (3D) memory configuration. As an example, the memory 104 may have a 3D vertical bit line (VBL) configuration. In a particular implementation, the memory 104 includes a non-volatile memory having a 3D memory configuration that is monolithically formed in one or more physical levels of arrays of storage elements (e.g., memory cells) having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory device 103 (and/or the memory 104) may include circuitry associated with operation of the storage elements of the memory 104. For example, the memory device 103 (and/or the memory 104) may include support circuitry, such as read/write circuitry 113, to support operation of one or more memory dies of the memory device 103. Although depicted as a single component, the read/write circuitry 113 may be divided into separate components of the memory device 103, such as read circuitry and write circuitry. The read/write circuitry 113 may be external to the one or more memory dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies.

The memory 104 may include multiple groups of storage elements. For example, the memory 104 may include a representative group of storage elements 106 (e.g., a group of memory cells). The group of storage elements 106 may include a representative storage element 108 (e.g., a memory cell). The storage element 108 may be configured to function as a single-level-cell (SLC), as a multi-level-cell (MLC), or as a tri-level-cell (TLC), as illustrative, non-limiting examples. Each of the groups of storage elements, such as the group of storage elements 106, of the memory 104 may correspond to one or more word lines, blocks, planes, or another definable group of storage elements.

The controller 130 is coupled to the memory device 103 via a bus 121, a memory interface (e.g., interface circuitry, such as a second interface 132), another structure, or a combination thereof. For example, the bus 121 may include one or more channels to enable the controller 130 to communicate with a single memory die of the memory device 103. As another example, the bus 121 may include multiple distinct channels to enable the controller 130 to communicate with each memory die of the memory device 103 in parallel with, and independently of, communication with other memory dies of the memory device 103.

The controller 130 is configured to receive data and instructions from the access device 170 and to send data to the access device 170. For example, the controller 130 may send data to the access device 170 via the first interface 110, and the controller 130 may receive data from the access device 170 via the first interface 110. The controller 130 is configured to send data and commands to the memory 104 and to receive data from the memory 104. For example, the controller 130 is configured to send data and a write command to cause the memory 104 to store data to storage elements corresponding to a specified address of the memory 104. The write command may specify a physical address of a portion of the memory 104 (e.g., a physical address of a word line of the memory 104) that is to store the data. The controller 130 may also be configured to send data and commands to the memory 104 associated with background scanning operations, garbage collection operations, and/or wear leveling operations, etc., as illustrative, non-limiting examples. The controller 130 is configured to send a read command to the memory 104 to access data from storage elements corresponding to a specified address of the memory 104. The read command may specify the physical address of a portion of the memory 104 (e.g., a physical address of a word line of the memory 104).

The controller 130 includes a set of registers 133, a command module 138, and a memory 150. The set of registers 133 may include an array of bits 136. For each command of a plurality of commands that are executable by the data storage device 102, the array of bits 136 may include a corresponding bit. For example, a first bit of the array of bits 136 may correspond to a first command (CMD1), a second bit of the array of bits 136 may correspond to a second command (CMD2), a third bit of the array of bits 136 may correspond to a third command (CMD3), a fourth bit of the array of bits 136 may correspond to a fourth command (CMD4), and a fifth bit of the array of bits 136 may correspond to a fifth command (CMD5). Although the array of bits 136 is described as including five bits, in other implementations, the array of bits 136 may include more than or fewer than five bits.

Each command of the plurality of commands may be categorized (or tagged) as being authorized to be executed or unauthorized to be executed based a corresponding bit value of the array of bits 136. As an illustrative, non-limiting example, a bit value of "0" may indicate that a particular command categorized as unauthorized, and a bit value of "1" may indicate that the particular command categorized as authorized. To illustrate, as depicted in FIG. 1, the array of bits 136 indicates that the third command (CMD3) is authorized to be executed and that the fifth command (CMD5) is unauthorized to be executed.

The memory 150 may include a first authorization scheme 152. The first authorization scheme 152 may include data that categorizescommands (of the plurality of commands that are executable by the data storage device 102) as authorized or unauthorized to be executed for a particular mode, such as the first mode. To illustrate, the first mode may correspond to a command queue mode in which a command queue 134 is enabled and occupied (e.g., includes one or more authorized commands that are awaiting execution). The first authorization scheme 152 may include or be associated with data that categorizes (or tags) a set of authorized commands 146 and a set of unauthorized commands for the particular mode. For example, the first authorization scheme 152 may include or be associated with an array of bits 136 (e.g., a bit map) that is loaded into the registers 133 in response to the controller 130 (e.g., the command module 138) being configured in the particular mode. In this example, each bit of the array of bits 136 may correspond to a command that is recognized by the command module 138. Thus, the array of bits 136 together correspond to a set of recognized commands. Further, in this example, a first set bits of the array of bits 136 that have a first value correspond to commands that are authorized for execution in the particular mode (e.g., the set of authorized commands 146), and a second set bits of the array of bits 136 that have a second value correspond to commands that are not authorized for execution in the particular mode (e.g., the set of unauthorized commands 148). In other implementations, the first authorization scheme 152 may be include or be associated with a list(s) of authorized and/or unauthorized commands.

Examples of recognized commands are defined in the eMMC specification. Table 1, below, lists several examples of recognized commands and command indices associated with each. Table 1 is not intended to list all commands that the controller 130 may recognize. For example, the eMMC specification also lists several reserved command indices, which are not listed in Table 1.

TABLE 1

| CMD Index | Abbreviation | Brief Command Description |
|---|---|---|
| CMD0 | GO_IDLE_STATE | Resets an EMMC chip to idle state |
| CMD1 | SEND_OP_COND | Requests Operating Conditions Register contents |
| CMD2 | ALL_SEND_CID | requests CID number on the CMD line |
| CMD3 | SET_RELATIVE_ADDR | Assigns a relative address |
| CMD6 | SWITCH | Switches operation mode or modifies the EXT_CSD registers |
| CMD7 | SELECT/DESELECT_CARD | Selects a device by its relative address |
| CMD8 | SEND_EXT_CSD | Requests EXT_CSD register as a block of data |
| CMD9 | SEND_CSD | Requests Card-Specific Data (CSD) |
| CMD10 | SEND_CID | Requests Card Identification (CID) |
| CMD12 | STOP_TRANSMISSION | Forces an EMMC chip to stop transmission |
| CMD13 | SEND_STATUS | Requests status register |
| CMD14 | BUSTEST_R | Reads reversed bus testing data pattern from an EMMC chip |
| CMD15 | GO_INACTIVE_STATE | Sets an EMMC chip to inactive state |
| CMD16 | SET_BLOCKLEN | Sets a block length (in bytes) for length following block commands (e.g., read and write) |
| CMD17 | READ_SINGLE_BLOCK | Reads a block of a size selected by the SET_BLOCKLEN command |
| CMD18 | READ_MULTIPLE_BLOCK | Reads Multiple blocks |
| CMD19 | BUSTEST_W | A host sends a bus test data pattern to a EMMC chip |
| CMD23 | SET_BLOCK_COUNT | Defines a number of blocks which are going to be transferred in an immediately succeeding multiple block read or write command |
| CMD24 | WRITE_BLOCK | Writes a block of a size selected by the SET_BLOCKLEN command |
| CMD25 | WRITE_MULTIPLE_BLOCK | Continuously writes blocks of data until a STOP_TRANSMISSION follows or a requested number of block is received |
| CMD27 | PROGRAM_CSD | Programs programmable bits of the CSD |
| CMD28 | SET_WRITE_PROT | Sets a write protection bit of an addressed group |
| CMD29 | CLR_WRITE_PROT | Clears a write protection bit of an addressed group |
| CMD30 | SEND_WRITE_PROT | Requests a status of write protection bits |
| CMD35 | ERASE_GROUP_START | Sets an address of an initial erase group within a range to be selected for erase |
| CMD36 | ERASE_GROUP_END | Sets an address of a last erase group within a continuous range to be selected for erase |
| CMD38 | ERASE | Erases all previously selected write blocks |
| CMD39 | FAST_IO | Writes and reads 8 bit (register) data fields |
| CMD40 | GO_IRQ_STATE | Sets a system into interrupt mode |
| CMD42 | LOCK_UNLOCK | Used to set/reset a password or lock/unlock an EMMC chip |

The command module 138 may include an execution unit 135, the command queue 134, a parse module 140, and a mode indicator 142. In some implementations, the execution unit 135 is a component of the controller 130, and the command module 138 is executed by or implemented by the execution unit 135. For example, the execution unit 135 may include or correspond to a processor, an application specific integrated circuit (ASIC), or another circuit that includes logic to enable execution of software or firmware code. In this example, the command module 138 may include or correspond to software or firmware code that is executed by the execution unit 135. The execution unit 135 may also execute or implement commands that are recognized and authorized (e.g., commands of the set of authorized commands 146).

The mode indicator 142 may indicate whether the controller 130 (e.g., the command module 138) is configured for operation in a first mode or is configured for operation in another mode (e.g., a second mode). In some implementations, the first authorization scheme 152 may correspond to the first mode. To illustrate, the first mode may include a command queue mode, and the second mode may include a non-command queue mode, such as a transfer mode. The mode indicator 142 may have a first value when the controller 130 is configured for operation in the first mode (e.g., when the command queue 134 is enabled and occupied) and may have a second value when the control 130 is configured for operation in the second mode (e.g., when the command queue 134 is not enabled or is not occupied). The first mode (e.g., the command queue mode) and the second mode (e.g., the non-command queue mode) may be associated with an eMMC protocol.

When the mode indicator 142 indicates that the controller 130 is configured for operation in the first mode, the controller 130 may be configured to execute any of a first set of commands (e.g., one or more commands of the set of authorized commands 146) if such command is received or placed in the command queue 134. Further, when the mode indicator 142 indicates that the controller 130 is configured for operation in the first mode, the controller 130 may be configured to discard, ignore or otherwise not execute second commands of any of a second set commands, such as the set of unauthorized commands (e.g., one or more commands of the set of unauthorized commands 148) if such command is received or placed in the command queue 134. When the mode indicator 142 indicates that the controller 130 is configured for operation in the second mode, the controller 130 may be configured to execute a different set commands, to discard, ignore or otherwise not execute a different commands, or both. In some implementations, when the mode indicator 142 indicates that the controller 130 is configured for operation in the second mode, all commands of the set of recognized commands may be authorized for execution by the controller 130 and no recognized command may be unauthorized for execution.

Commands, such as a command 162, received from the access device 170 may be enqueued at the command queue 134 for subsequent execution (e.g., by the execution unit 135). Although the command queue 134 is described as a single queue, in other implementations, the command queue 134 may include multiple queues, such as separate queues for read operations and write operations, as an illustrative, non-limiting example.

The parse module 140 may be configured to receive one or more commands, such as the command 162, from the access device 170. In response to receiving the command 162, the parse module 140 may parse the command 162 to identify a command index value 166 (e.g., CMD2) of the command 162. Based on the command index value 166 of the command 162, the command module 138 may determine whether the command 162 (e.g., CMD2) is authorized to be executed or unauthorized to be executed. To illustrate, the command module 138 may determine a bit value of the array of bits 136 that corresponds to the command index value 166. If the bit value indicates that the command 162 is categorized as unauthorized for execution, the command module 138 may discard, ignore or otherwise not execute the command 162. Alternatively, if the bit value indicates that the command 162 is categorized as authorized for execution, the command module 138 may provide the command 162 (e.g., the command index value 166) to the command queue 134.

Additionally or alternatively, the parse module 140 may parse the command to determine whether the command 162 includes an indication 164 to change an authorization/ authorization of a particular command. In some implementations, the indication 164 may be included in reserved bits of an argument of the command 162. For example, the command 162 may include an argument that indicates that a command associated with a different command index (e.g., CMD4) is to be authorized for execution. In response to the indication 164, the command module 138 may be configured to authorize execution of the fourth command (CMD4). To configure the command module 138 to authorize execution of the fourth command (CMD4), the parse module 140 may send data 168 to the registers 133 to modify a bit value corresponding to the fourth command (CMD4) to categorize the fourth command (CMD4) as authorized. To illustrate, the parse module 140 may send data 168 to the register 133 to change the bit value corresponding to the fourth command (CMD4) from a 0 value (that indicates execution of the fourth command (CMD4) is not authorized) to a 1 value (that indicates execution of the fourth command (CMD4) is authorized). Thus, if the access device 170 desires to execute a command that is not normally authorized for execution while operating in the first mode, the access device 170 can send the indication 164 to temporarily cause the command to be authorized without exiting the first mode.

To illustrate, while the mode indicator 142 indicates that the controller 130 is configured for operation in the first mode, the controller 130 may execute a particular command that results in an exception. To determine a cause of the exception, the access device 170 could issue a command associated with command index CMD8 (e.g., a command to request contents of a card specific data registers). However, during operation in a command queue mode (e.g., the first mode), the CMD8 may not be authorized. According to a particular implementation, the access device 170 may issue a command associated with command index CMD13 (e.g., to request status of registers), which is authorized for execution in the first mode. An argument (or reserved bits) of the CMD13 command may indicate that CMD8 is to be authorized for execution. Based on the argument (or reserved bits), a value of a bit of the array of bits 136 may be changed to categorize the CMD8 command as authorized. Thus, a command that is authorized for execution in the first mode (e.g., CMD13) may be used to cause an unauthorized command (e.g., CMD8) to be authorized by changing a value of a bit in the array of bits 136. After causing the CMD8 command to be authorized and executed, the access device 170 may issue another command to causes the value of the bit of the array of bits 136 to be changed again, to categorize the CMD8 command as again unauthorized.

In some implementations, the mode indicator 142 may indicate one of multiple modes. For example, mode indicator 142 may be set to indicate operation in the first mode (e.g., a command queue mode) or the second mode (e.g., a non-command queue mode). As described above, the first mode may correspond to the first authorization scheme 152 which includes the set of authorized commands 146 and the set of unauthorized commands 148. Additionally or alternatively, the first mode may correspond to a second set of unauthorized commands. When the first mode corresponds to both the first authorization scheme 152 and the second authorization scheme, the first authorization scheme 152 may be used to set values of the array of bits 136 when the command queue 134 is not empty and the second authorization scheme may be used to set the values of the array of bits 136 when the command queue 134 is empty. In some implementations, the first authorization scheme 152 may be more restrictive than the second authorization scheme such that fewer commands are authorized for execution under the first authorization scheme 152 as compared to the second authorization scheme. Additionally, the second mode (e.g., the non-command queue mode) may correspond to a third authorization scheme. In some implementations the third authorization scheme may be less restrictive than the first authorization scheme 152, the second authorization scheme, or both.

In some implementations, after the data storage device 102 powers on or exits an standby period, the command module 138 may set the mode indicator 142 to indicate operation in the second mode (e.g., the non-command queue mode). The access device 170 may send an enter command queue mode instruction to cause the command module to change the mode indicator 142 from the second mode (e.g., the non-command queue mode) to the first mode (e.g., the command queue mode). While the mode indicator 142 is set to the first mode, the access device 170 may send one or more first commands (that are include in the set of authorized commands 146) to the data storage device 102 for execution.

In an illustrative, non-limiting example, the access device 170 and the data storage device 102 may communicate using an eMMC protocol. To send the indication 164 to the data storage device 102, the access device 170 may include the indication 164 in a particular command, such as command 13 (CMD1 3) used by the eMMC protocol. For example, the access device 170 may include the indication 164 in an argument or reserved bits of the command 13 (CMD1 3). To illustrate, an argument of the command 13 (CMD1 3) of the eMMC protocol may include 32 bits, such as bits [31:0]. A format of the command 13 (CMD1 3) may indicate that bits [31:16] indicate a relative card address (RCA), bit [15] indicates a send queue status (SQS), bits [14:1] are reserved bits (e.g., stuff bits, such as all 0's or all 1's), and bit [0] is a high priority interrupt (HPI) indicator. The access device 170 may include the indication 164 in reserved bits [14:1].

As an illustrative, non-limiting example, the indication 164 may include a bit that is a command authorize/unauthorize indicator at bit [7] of the argument and a command index value (e.g., an opcode of a command) at bits [6:1] of the argument. A value of the command authorize/unauthorize indicator at bit [7] may indicate whether to authorize or unauthorize execution of a command corresponding to the command index value at bits [6:1]. For example, if the bit [7] is a 1 value, the command corresponding to the command index value is to be authorized for execution. To illustrate, the command index value may correspond to command 6 (CMD6) or command 8 (CMD8) of the eMMC protocol. Alternatively, if the bit [7] is a 0 value, the command corresponding to the command index value is to be unauthorized for execution. As another illustrative, non-limiting example, the indication 164 may include a bit that is a command authorize/unauthorize indicator at bit [14], a command index value (e.g., an opcode of a command) at bits [13:7], and bits [6:1] may indicate a number of times to permit execution of the command. After the command has been executed the number of times indicated by bits [6:1], the command may be categorized as unauthorized for execution. As an additional illustrative, non-limiting example, the indication 164 in the reserved bits [14:1] may include a bit that is a command authorize/unauthorize indicator at bit [14], a first command index value (e.g., an opcode of a command) at bits [13:7], and a second command index value (e.g., an opcode of another command) at bits [6:1]. By including two command index values, the indication 164 may authorize/unauthorize execution of two different commands.

In some implementations, the command module 138 may be configured to temporarily authorize execution of a particular command, such as the fourth command (CMD4) in response to the indication 164. After a single execution or multiple executions of the particular command, execution of the particular command may be automatically unauthorized by the command module 138 (e.g., data associated with the particular command may be modified to indicate that the particular command is categorized as unauthorized). Additionally or alternatively, the command module 138 may prohibit execution of the particular in response to a second indication received from the access device 170 that indicates to unauthorize the particular command. In some implementations, the command module 138 may unauthorize the particular command after execution of the particular command. In other implementations, the command module 138 may unauthorize the particular command after the particular command is provided to the command queue 134. In such implementations, once the particular command is included in the command queue 134, the particular command may be executed independent of the array of bits 136.

In some implementations, the data storage device 102 may include an (ECC) engine (not shown). The ECC engine may be configured to receive data, such as the data 160, and to generate one or more ECC codewords (e.g., including a data portion and a parity portion) based on the data. For example, the ECC engine may receive the data 160 and may generate a codeword. To illustrate, the ECC engine may include an encoder configured to encode the data using an ECC encoding technique. The ECC engine may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

The ECC engine may include a decoder configured to decode data read from the memory 104 to detect and correct bit errors that may be present in the data. For example, the ECC engine may correct a number of bit errors up to an error correction capability of an ECC technique used by the ECC engine. In some implementations, the ECC engine may be configured to determine and/or track a failed bit count (FBC), a bit error rate, or both, corresponding to data decoded by the ECC engine.

In some implementations, the command queue 134, the mode indicator 142, and or the first authorization scheme 152 may be stored at the memory 104. In other implementations, the controller 130 may include or may be coupled to a particular memory (e.g., the memory 150), such as a random access memory (RAM), that is configured to store the command queue 134, the mode indicator 142, and or the first authorization scheme 152. For example, a portion of the memory 150 may be configured to be used as the command queue 134. Alternatively, or in addition, the controller 130 may include or may be coupled to another memory (not shown), such as a non-volatile memory, a RAM, or a read only memory (ROM). The other memory may be a single memory component, multiple distinct memory components, and/or may include multiple different types (e.g., volatile memory and/or non-volatile) of memory components. In some implementations, the other memory may be included in the access device 170.

Although one or more components of the data storage device 102 have been described with respect to the controller 130, in other implementations certain components may be included in the memory device 103 (e.g., the memory 104). For example, one or more of the registers 133, the command module 138, and/or the memory 150 may be included in the memory device 103. Alternatively, or in addition, one or more functions as described above with reference to the controller 130 may be performed at or by the memory device 103. For example, one or more functions of the registers 133, the command module 138, and/or the memory 150 may be performed by components and/or circuitry included in the memory device 103. Alternatively, or in addition, one or more components of the data storage device 102 may be included in the access device 170. Alternatively, or in addition, one or more functions as described above with reference to the controller 130 may be performed at or by the access device 170.

By configuring the command module 138 to authorize execution of a particular command (e.g., an unauthorized command) while remaining in the first mode, the particular command may be received and executed while the command module 138 is in the first mode. For example, the particular command may be executed without emptying command queue 134.

Figure 2:
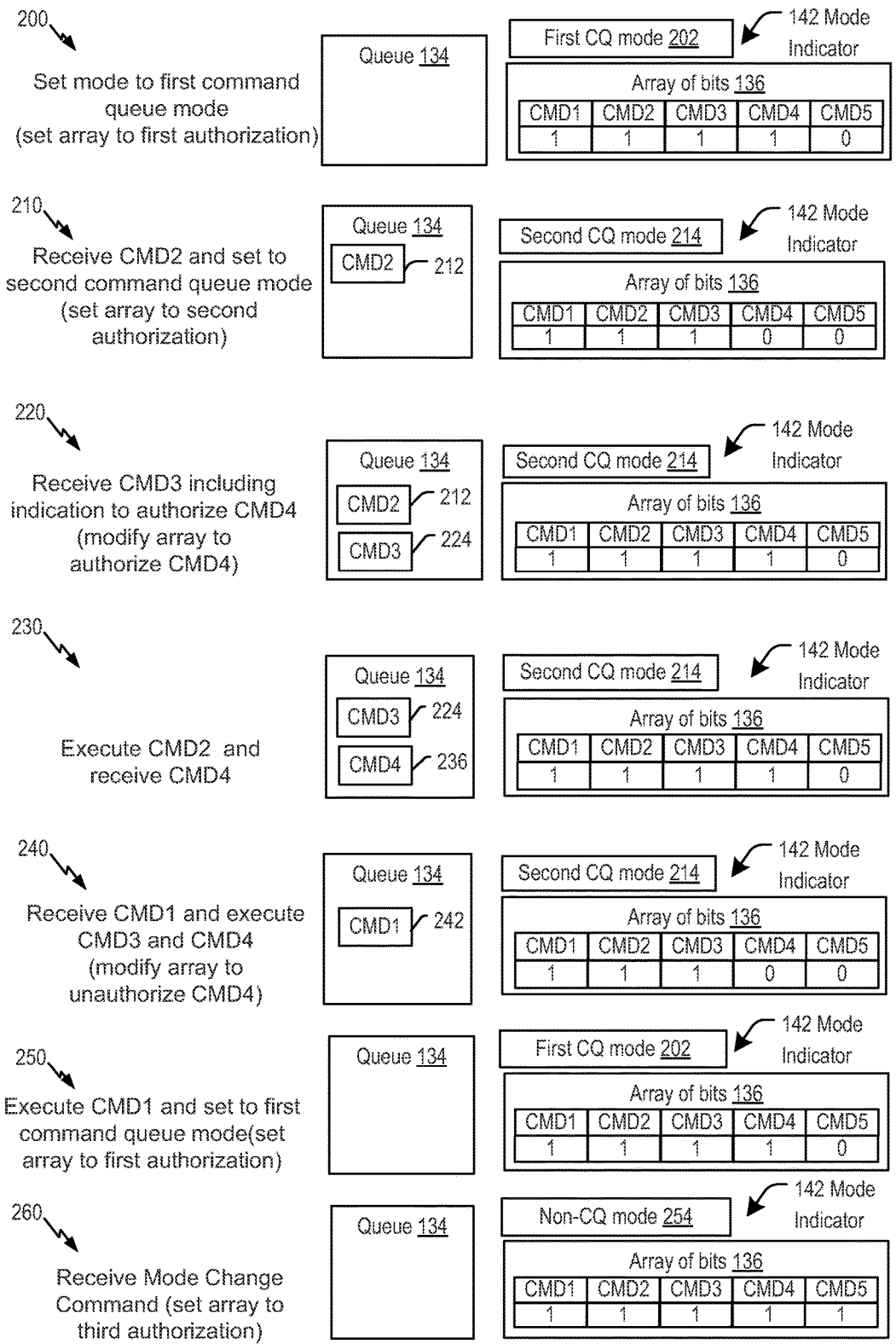
FIG. 2 is a particular illustrative example of operation of the data storage device of FIG. 1.

Referring to FIG. 2, a particular illustrative example of stages of operation of a data storage device is depicted. For example, the data storage device may include or correspond to the data storage device 102 of FIG. 1. Each stage of operation depicted in FIG. 2 shows a corresponding state of the command queue 134, the mode indicator 142 and the array of bits 136 after one or more functions/operations have been performed.

A first stage of operation of the data storage device is depicted and generally designated 200. As depicted at the first stage of operation 200, the mode indicator 142 has been set to a first command queue mode 202 (e.g., a command queue mode when the command queue 134 is empty) and the array of bits 136 has been set to a first authorization bit sequence that corresponds to the first command queue mode 202.

A second stage of operation of the data storage device is depicted and generally designated 210. As depicted at the second stage of operation 210, the second command (CMD2) 212 has been received and been added to the command queue 134 in response to a determination the second command (CMD2) 212 is authorized for execution. For example, the second command (CMD2) 212 may have been determined to be authorized for execution according to the array of bits 136 as depicted in the first stage of operation 200. In response to the second command (CMD2) 212 being added to the command queue 134, the mode indicator 142 may be updated to a second command queue mode 214 (e.g., a command queue mode when the command queue 134 includes one or more commands). The array of bits 136 may be set to a second authorization bit sequence that correspond to the second command queue mode 214. The second authorization bit sequence may be different from the first authorization bit sequence. For example, the fourth command (CMD4) may be authorized for execution according to the first authorization bit sequence and may be unauthorized for execution according to the second authorization bit sequence.

A third stage of operation of the data storage device is depicted and generally designated 220. As depicted at the third stage of operation 220, the third command (CMD3) 224 has been received and been added to the command queue 134 in response to a determination the third command (CMD3) 224 is authorized for execution. For example, the third command (CMD3) 224 may have been determined to be authorized for execution according to the array of bits 136 as depicted in the second stage of operation 210. The third command (CMD3) 224 may have included an indication to authorize the fourth command (CMD4) for execution. In response to the indication, a bit value of the array of bits 136 corresponding to the fourth command (CMD4) (as depicted in the second stage of operation 210) may have been modified from a 0 value to a 1 value. Accordingly, the array of bits 136 as depicted at the third stage of operation 220 categorizes the fourth command (CMD4) as authorize for execution while the mode indicator 142 is the second command queue mode 214 (e.g., while the command queue 134 includes at least one command).

A fourth stage of operation of the data storage device is depicted and generally designated 230. As depicted at the fourth stage of operation 230, the second command (CMD2) 212 has been executed and the fourth command (CMD4) 236 has been received and been added to the command queue 134 in response to a determination the fourth command (CMD4) 236 is authorized for execution. For example, the fourth command (CMD4) 236 may have been determined to be authorized for execution according to the array of bits 136 as depicted in the third stage of operation 220.

A fifth stage of operation of the data storage device is depicted and generally designated 240. As depicted at the fifth stage of operation 240, the first command (CMD1) 242 has been received and has been added to the command queue 134 in response to a determination the first command (CMD1) 242 is authorized for execution. For example, the first command (CMD1) 242 may have been determined to be authorized for execution according to the array of bits 136 as depicted in the fourth stage of operation 230. Additionally, each of the third command (CMD3) 224 and the fourth command (CMD4) 236 have been executed. After execution of the fourth command (CMD4), the bit value of the array of bits 136 corresponding to the fourth command (CMD4) (as depicted in the fourth second stage of operation 230) may have been modified from a 1 value to a 0 value. Accordingly, the array of bits 136 as depicted at the fifth stage of operation 240 categorizes the fourth command (CMD4) as unauthorized for execution while the mode indicator 142 is the second command queue mode 214 (e.g., while the command queue 134 includes at least one command). For example, the array of bits 136 as depicted at the fifth stage of operation 240 may correspond to the second authorization bit sequence.

A sixth stage of operation of the data storage device is depicted and generally designated 250. As depicted at the sixth stage of operation 250, the first command (CMD1) 424 has been executed. After execution of the first command (CMD1), the command queue 134 is empty. In response to the command queue 134 being empty, the mode indicator 142 may be set to the first command queue mode 202 and the array of bits 136 may be set to the first authorization bit sequence.

A seventh stage of operation of the data storage device is depicted and generally designated 260. As depicted at the seventh stage of operation 260, a mode change command has been received and the mode indicator 142 has been changed from the first command queue mode 202 to a non-command queue mode 254, such as a transfer mode. In response to the mode indicator 142 being the non-command queue mode 254, the array of bits 136 has been set to a third authorization bit sequence that corresponds to the non-command queue mode 254. The third authorization bit sequence may be different from the first authorization bit sequence the second authorization bit sequence, or both.

The examples of the different stages of operation described with reference to FIG. 2 thus illustrate how the array of bits 136 may be modified to temporarily authorize a particular command to be executed during a command queue mode, such as the first command queue mode 202 or the second command queue mode 214. For example, the particular command may be temporarily authorized without having to flush the command queue 134 and without having to execute all pending commands in the command queue 134.

Figure 3:
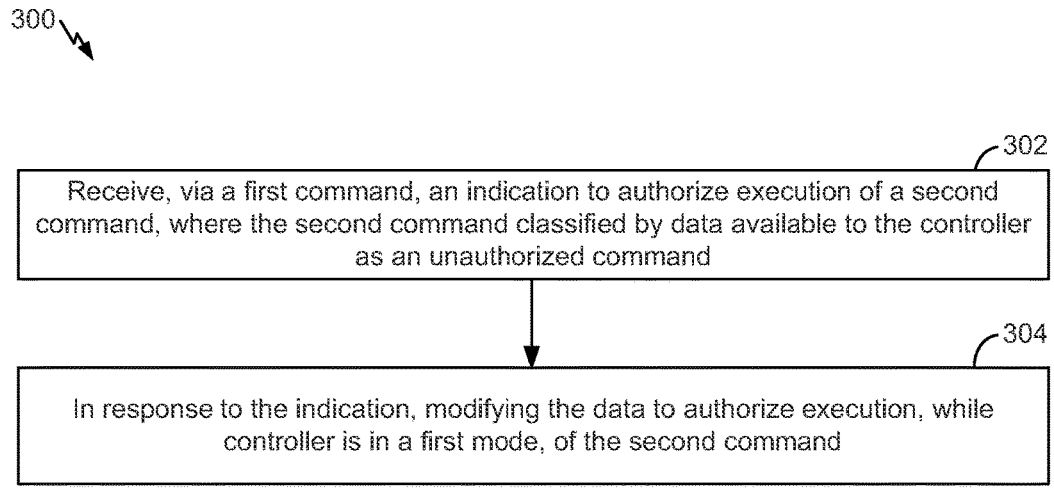
FIG. 3 is a flowchart of a particular illustrative example of a method of authorizing execution of an unauthorized command.

Referring to FIG. 3, a particular illustrative example of a method of authorizing execution of an unauthorized command is depicted and generally designated 300. The method 300 may be performed at the data storage device 102, such as the controller 130, and/or the access device 170 of FIG. 1, or a combination thereof, as illustrative, non-limiting examples.

The method 300 includes, while the data storage device is in a first mode, receiving, via a first command, an indication to authorize execution of a second command that is categorized by data available to the controller as an unauthorized command, at 302. For example, the indication may include or correspond to the indication 164 of FIG. 1, which is received at the controller 130 via the command 162. To identify that the indication has been received, bits of received commands may be parsed to determine whether any of the received commands includes the indication. The indication may include a command index and an enable bit. The command index is associated with the command. To illustrate, the command index may include an identifier of the command, such as a bit value that corresponds to an op-code of the command The enable bit may have a value that indicates whether to categorize the command as authorize or un-authorize. The first mode may include a command queue mode, such as a command queue mode of an (eMMC) protocol.

In some implementations, the indication may be received by a data storage device, such as the data storage device 102 of FIG. 1. For example, the indication may be received at a controller, such as the controller 130 of FIG. 1, of the data storage device via an interface, such as an eMMC interface of the data storage device. The controller may be configured to operate according to a first mode when the indication is received. While in the first mode, the controller may be configured to execute first commands of one or more authorized commands and to discard (or otherwise not execute) second commands of the one or more unauthorized commands.

The method 300 also includes, in response to the indication, modifying the data to authorize execution of the second command while the controller is in the first mode, at 304. For example, the data accessible to the controller may include the array of bits 136 of FIGS. 1 and 2. In this example, modifying the data to authorize execution of the second command may include changing a value of one or more of the bits of the array of bits 136.

In some implementations, the command may be received and the second command may include the indication. If the indication is included in the second command, the second command may be executed after modifying the data to categorize the second command as authorized. In other implementations, a second command may be received that includes the indication. For example, the indication may be included in reserved bits of the second command.

In some implementations, after modifying the data to categorize the second command as authorized, the method 300 may include receiving the second command and executing the second command. To illustrate, the data storage device may receive the second command while the data storage device (e.g., the controller) is configured in the first mode. A command index value of the second command may be identified and, based on the command index value, a bit of an array of bits may be identified. Each bit of the array of bits corresponds to a different command index value. For example, the array of bits may include or correspond to the array of bits 136. The identified bit of the array of bits may correspond to the command index value (e.g., the command) and a value of the bit may indicates whether execution of the second command is authorized (permitted) or unauthorized (prohibited). In response to determining that execution of the second command is authorized based on the value of the bit, the second command may be provided to a command queue.

After executing the second command (or after the second command is provided to the command queue), the command module may be configured to reject (e.g., discard) the second command while in the first mode. For example, after executing the second command (or after the second command is provided to the command queue), the control module may automatically modify the data to categorize the second command as unauthorized for execution in the first mode. As another example, after executing the second command (or after the second command is provided to the command queue), a second indication of the second command may be received (e.g. via a third command), and the command module may modify the data to cateogorize the second command as unauthorized for execution in the first mode based on the second indication.

By enabling the command module to authorize execution of the second command while remaining in the first mode, the second command may be received and executed while the command module is in the first mode without emptying the command queue 134.

Figure 4:
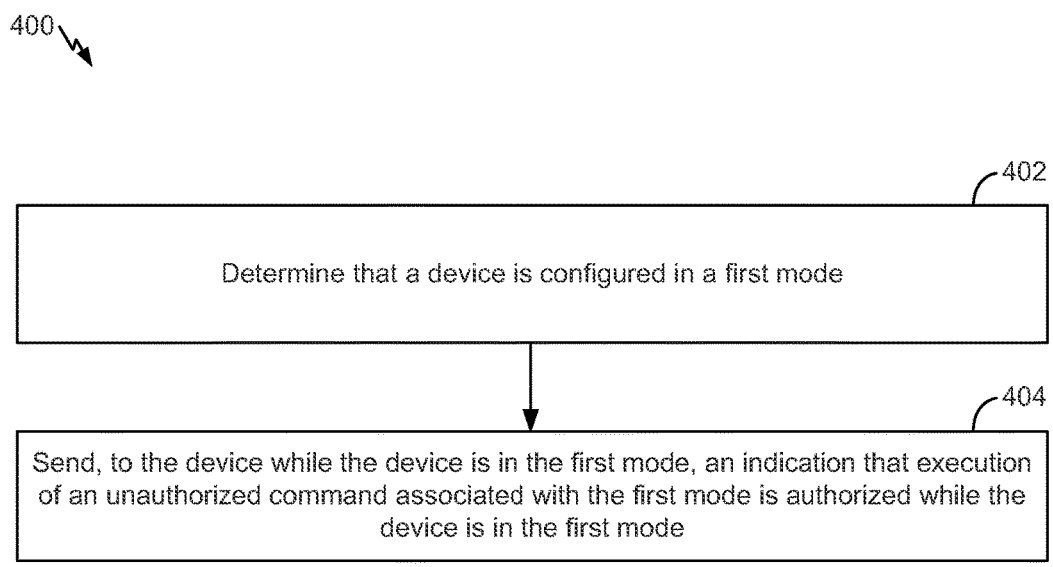
FIG. 4 is a flowchart of a particular illustrative example of a method of sending an indication that execution of an unauthorized command is authorized.

Referring to FIG. 4, a particular illustrative example of a method of sending an indication that execution of an unauthorized command is authorized is depicted and generally designated 400. The method 400 may be performed at the data storage device 102, such as the controller 130, and/or the access device 170 of FIG. 1, or a combination thereof, as illustrative, non-limiting examples.

The method 400 includes determining that a device is configured in a first mode, at 402. The method 400 also includes sending, to the device while the device is in the first mode, an indication that execution of an unauthorized command associated with the first mode is authorized while the device is in the first mode, at 404. For example, the indication may include or correspond to the indication 164 of FIG. 1. The indication may be sent via an interface, such as the third interface 172, that is configured to send the indication to the device. The interface may include an eMMC interface, as an illustrative, non-limiting example.

In some implementations, the method 400 may include sending the unauthorized command to the device. The indication may be included in the unauthorized command. Alternatively, the indication may be included in another command that is sent to the device before the unauthorized command is sent to the device. The other command may be an authorized command or another unauthorized command In some implementations, a command (e.g., the unauthorized command or another command) may be generated that includes the indication. For example, a processor, such as the processor 174, may be configured to generate the indication that is included as part of the command. For example, the indication may be included in a set of reserved bits of the command. In addition to indicating authorization to execute the unauthorized command, the indication may also indicate that execution of a second unauthorized command associated with the first mode is authorized while the device is in the first mode. To illustrate, the indication may include a first command index associated with (e.g., that identifies) the unauthorized command and a second command index associated with (e.g., that identifies) the second unauthorized command.

By generating the indication, the access device may instruct the device to temporarily authorize execution of an unauthorized command while in the first mode. For example, once authorized, the command may be executed while the device is in the first mode without having to flush a command queue of the device and without having to execute all pending commands in the command queue. Accordingly, by sending the indication to the device, the access device may not have to wait for the command queue to be flushed or for all pending commands in the command queue to be executed prior to execution of the unauthorized command.

The method 300 of FIG. 3 and/or the method 400 of FIG. 4 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 300 of FIG. 3 and/or the method 400 of FIG. 4 can be initiated or controlled by one or more processors, such as one or more processors included in or coupled to a controller or a memory of the data storage device 102 or the access device 170 of FIG. 1. A controller configured to perform the method 300 of FIG. 3 and/or the method 400 of FIG. 4 may be able to authorize execution of an unauthorized command. As an example, one or more of the methods of FIGS. 3-4, individually or in combination, may be performed by the controller 130 of FIG. 1. To illustrate, a portion of one of the methods FIGS. 3-4 may be combined with a second portion of one of the methods of FIGS. 3-4. Additionally, one or more operations described with reference to the FIGS. 3-4 may be optional, may be performed at least partially concurrently, and/or may be performed in a different order than shown or described.

Although various components of the data storage device 102, such as the controller 130, or the access device 170 of FIG. 1 are depicted herein as block components and described in general terms, such components may include one or more physical components, such as hardware controllers, one or more microprocessors, state machines, logic circuits, one or more other structures, other circuits, or a combination thereof configured to enable the various components to perform operations described herein.

Components described herein may be operationally coupled to one another using one or more nodes, one or more buses (e.g., data buses and/or control buses), one or more other structures, or a combination thereof One or more aspects of the various components may be implemented using a microprocessor or microcontroller programmed to perform operations described herein, such as one or more operations of the method the method 300 of FIG. 3 and/or the method 400 of FIG. 4.

Alternatively or in addition, one or more aspects of the data storage device 102, such as the controller 130, or the access device 170 of FIG. 1 may be implemented using a microprocessor or microcontroller programmed (e.g., by executing instructions) to perform operations described herein, such as one or more operations of the method 300 of FIG. 3 and/or one or more operations of the method 400 of FIG. 4, as described further herein. As an illustrative, non-limiting example, the data storage device 102 includes a processor executing instructions (e.g., firmware) retrieved from the memory 104. Alternatively or in addition, instructions that are executed by the processor may be retrieved from a separate memory location that is not part of the memory 104, such as at a read-only memory (ROM).

In some implementations, each of the controller 130, the memory device 103, and/or the access device 170 of FIG. 1 may include a processor executing instructions that are stored at a memory, such as a non-volatile memory of the data storage device 102 or the access device 170 of FIG. 1. Alternatively or additionally, executable instructions that are executed by the processor may be stored at a separate memory location that is not part of the non-volatile memory, such as at a read-only memory (ROM) of the data storage device 102 or the access device 170 of FIG. 1.

The memory 104 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory 104 may include another type of memory. The memory 104 may include a semiconductor memory device.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/ or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the examples described herein are intended to provide a general understanding of the various aspects of the disclosure. Other implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   a memory; and
   a controller coupled to the memory, wherein, while the controller is configured in a first mode to implement a first authorization scheme that classifies commands as authorized or unauthorized by adding commands classified as authorized to a command queue, executing the commands classified as authorized in the command queue, and discarding commands classified as unauthorized, the controller is configured to:
   receive, via a first command, an indication to authorize execution of a second command that is classified by data available to the controller as an unauthorized command according to the first authorization scheme, the indication including a bit that is indicative of authorization of the second command;

in response to the indication, modify the data according to the bit to temporarily authorize execution of the second command while the controller is in the first mode;
add the second command to the command queue;
execute the second command; and
in response to execution of the second command, modify the data to classify the second command as unauthorized for execution while the controller is in the first mode.

2. The device of claim 1, wherein:
the first mode comprises a command queue mode.

3. The device of claim 1, wherein:
the indication includes a command index and an enable bit, the command index associated with the second command, and
the enable bit indicates a categorization of the second command, the categorization configured to authorize execution of the second command.

4. The device of claim 1, further comprising a set of registers that includes an array of bits, wherein:
for each command of a plurality of commands, the array of bits includes a corresponding bit of the data, and
each command of the plurality of commands is classified as authorized or unauthorized for execution based on a bit value of the corresponding bit.

5. The device of claim 4, wherein:
a particular bit of the array of bits corresponds to the second command, and
the controller is further configured to change a value of the particular bit from a first value to a second value to modify the data to authorize execution of the second command.

6. The device of claim 5, wherein the controller is further configured to change the value of the particular bit from the second value to the first value to prohibit execution of the second command while in the first mode.

7. The device of claim 1, wherein the memory comprises a non-volatile memory that includes:
a three-dimensional (3D) memory configuration that is monolithically formed in one or more physical levels of arrays of storage elements, the one or more physical levels of arrays of storage elements having an active area disposed above a silicon substrate, and
circuitry associated with operation of the storage elements.

8. A method comprising:
in a data storage device that includes a memory and a controller, performing:
while the controller is in a first mode, implementing a first authorization scheme that classifies commands as authorized or unauthorized by adding commands classified as authorized to a command queue, executing the commands classified as authorized in the command queue, and discarding commands classified as unauthorized;
subsequently, receiving a first command including an indication to authorize execution of a second command, wherein the second command is classified by data available to the controller as an unauthorized command in the first authorization scheme, the indication including a bit that is indicative of authorization of the second command;
in response to the indication, modifying the data to temporarily authorize execution of the second command while the controller is in the first mode;
adding the second command to the command queue;
executing the second command; and
in response to execution of the second command, modifying the data to classify the second command as unauthorized for execution while the controller is in the first mode.

9. The method of claim 8, further comprising parsing bits of received commands to determine whether any of the received commands includes the indication.

10. The method of claim 8, wherein the indication is included in reserved bits of the first command.

11. The method of claim 8, wherein the first command is classified by the data as an authorized command, the authorized command authorized for execution while the controller is in the first mode.

12. The method of claim 8, further comprising, after modifying the data:
receiving the second command; and
executing the second command while the controller is in the first mode.

13. The method of claim 8, wherein the data is modified to classify the second command as unauthorized for execution while the controller is in the first mode automatically after execution of the second command.

14. The method of claim 8, wherein the data is modified to classify the second command as unauthorized for execution while the controller is in the first mode in response to receipt of a third command.

15. The method of claim 8, further comprising, while the controller is in the first mode:
receiving the second command;
identifying a command index value of the second command;
identifying a bit of an array of bits based on the command index value, wherein a value of the bit indicates whether execution of the second command is authorized or unauthorized; and
providing the second command to a command queue in response to determining that execution of the second command is authorized based on the value of the bit.

16. The method of claim 15, wherein each bit of the array of bits corresponds to a different command index value.

17. An access device comprising:
a memory configured to store instructions; and
a processor coupled to the memory, the processor configured to execute the instructions to cause the processor to:
determine that a device is configured in a first mode to implement a first authorization scheme that classifies commands as authorized or unauthorized by adding commands classified as authorized to a command queue, executing the commands classified as authorized in the command queue, and discarding commands classified as unauthorized;
send, to the device while the device is in the first mode, an indication that execution of an unauthorized command classified by data available to the controller as unauthorized according to the first authorization scheme is authorized while the device is in the first mode, the indication including a bit that is indicative of authorization of the unauthorized command to cause the device to:
in response to the indication, modify the data to temporarily authorize execution of the second command while the controller is in the first mode;
add the unauthorized command to the command queue;
execute the unauthorized command; and in response to execution of the unauthorized command, modify the data to classify the unauthorized command as unauthorized for execution while the device is in the first mode.

18. The access device of claim 17, further comprising an interface configured to send the indication to the device.

19. The access device of claim 17, wherein the processor is further configured to generate the indication.

20. A method comprising:
in an access device coupled to a data storage device, performing:
   determining that the data storage device is configured in a first mode to implement a first authorization scheme that classifies commands as authorized or unauthorized by adding commands classified as authorized to a command queue, executing the commands classified as authorized in the command queue, and discarding commands classified as unauthorized; and
   sending, to the data storage device while the data storage device is in the first mode, an indication that execution of an unauthorized command classified by data available to the controller as unauthorized according to the first authorization scheme is authorized while the data storage device is in the first mode, the indication including a bit that is indicative of authorization of the unauthorized command to cause the device to:
   in response to the indication, modify the data to temporarily authorize execution of the second command while the controller is in the first mode;
   add the unauthorized command to the command queue;
   execute the unauthorized command; and
   in response to execution of the unauthorized command, modify the data to classify the unauthorized command as unauthorized for execution while the device is in the first mode.

21. The method of claim 20, further comprising generating a command that includes the indication, wherein the command is an authorized command associated with the first mode.

22. The method of claim 20, further comprising generating a command that includes the indication in a set of reserved bits of the command.

23. The method of claim 20, wherein:
   the indication further indicates that execution of a second unauthorized command associated with the first mode is authorized while the data storage device is in the first mode, and
   the indication includes a first command index associated with the unauthorized command and a second command index associated with the second unauthorized command.

24. The method of claim 20, further comprising sending the unauthorized command to the data storage device.

25. An apparatus comprising:
means for storing information; and
means for controlling the means for storing information, the means for controlling configured to:
   receive, while the means for controlling is in a first mode implementing a first authorization scheme that classifies commands as authorized or unauthorized by adding commands classified as authorized to a command queue, executing the commands classified as authorized in the command queue, and discarding commands classified as unauthorized, an indication via a first command to authorize execution of a second command that is classified by data available to the means for controlling as an unauthorized command in the first authorization scheme, the indication including a bit that is indicative of authorization of the second command;
   in response to the indication, modify the data to temporarily authorize execution of the second command while the means for controlling is in the first mode;
   add the second command to the command queue;
   execute the second command; and
   in response to execution of the second command, modify the data to classify the second command as unauthorized for execution while the means for controlling is in the first mode.

26. The apparatus of claim 25, wherein the first mode comprises a command queue mode.

* * * * *